UNITED STATES PATENT OFFICE.

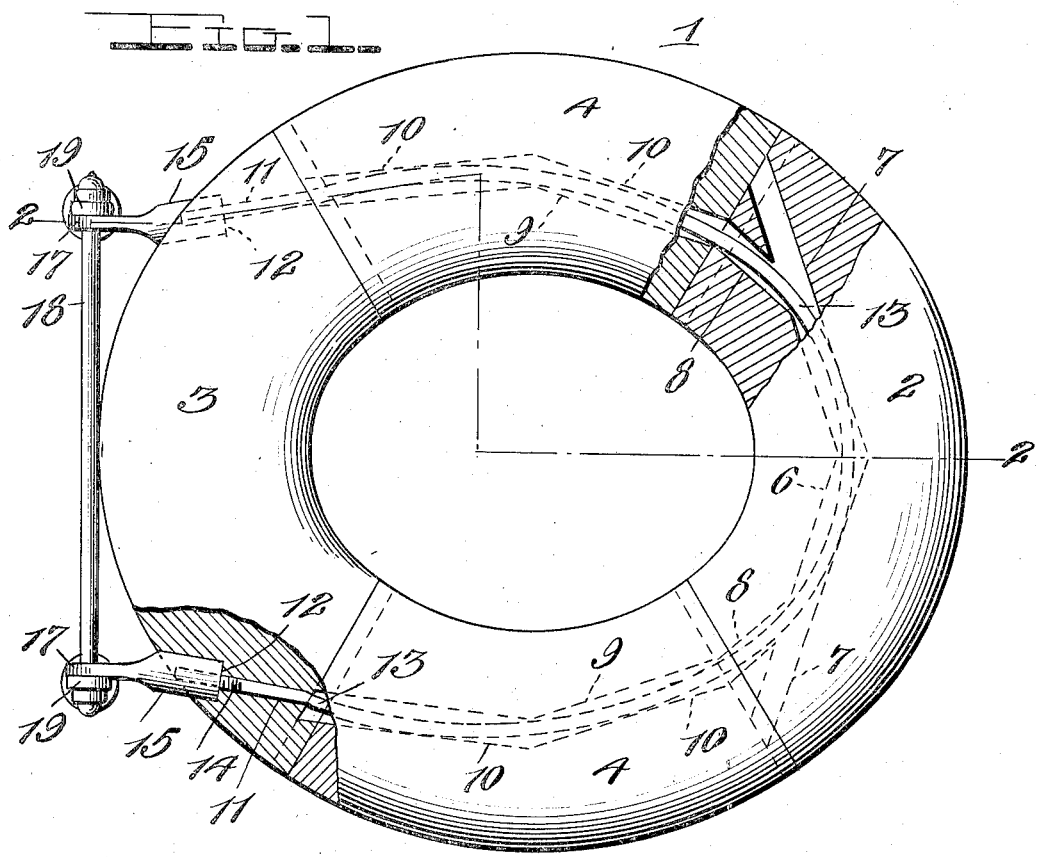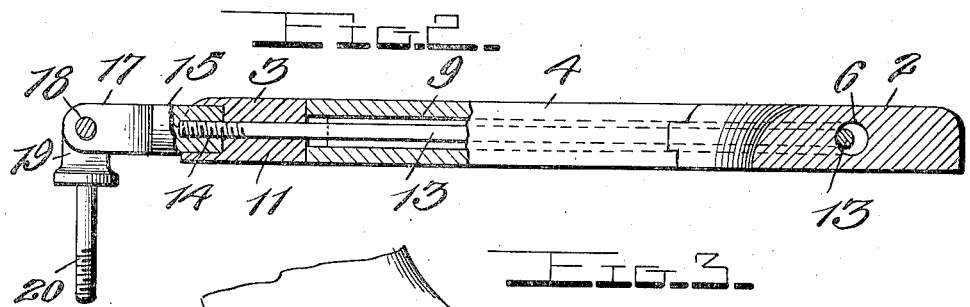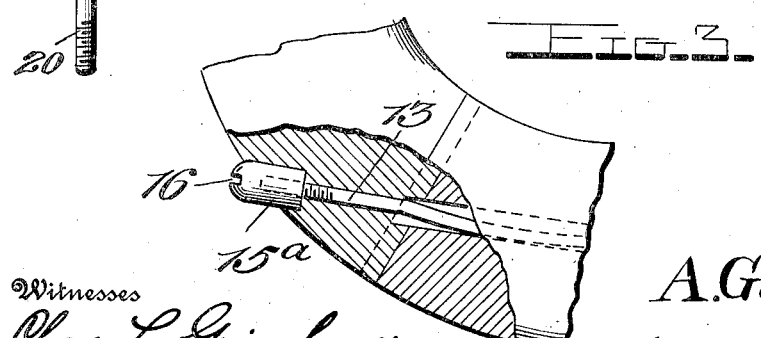

AUGUST GERTENBACH, OF QUINCY, ILLINOIS.

SEAT.

1,007,779.   Specification of Letters Patent.   Patented Nov. 7, 1911.

Application filed January 14, 1911. Serial No. 602,678.

*To all whom it may concern:*

Be it known that I, AUGUST GERTENBACH, a citizen of the United States, residing at Quincy, in the county of Adams and State of Illinois, have invented certain new and useful Improvements in Seats, of which the following is a specification, reference being had to the accompanying drawings.

This invention relates to improvements in seats which are substantially annular in form and are made up of segmental sections, the invention consisting in the construction, combination and arrangement of devices hereinafter described and claimed.

One object of my invention is to effect improvements in the construction of the said segments and to combine therewith an adductor rod which is employed to bind the sections together so firmly that the same cannot separate or open the joints between them.

Another object of my invention is to provide the sections of the seat with a bore to receive the adductor rod, which bore is spaced between the upper and lower surfaces of the seat, is entirely concealed, and requires the use of no fillet in connection with the adductor rod.

A further object of the invention is to combine with the said sections or segments, and the adductor rod, securing devices at the ends of the adductor rod which are adjustable thereon, so as to tension the adductor rod and cause the same to firmly bind and secure the said sections together, and also enable the adductor rod to be removed when it is desired to disassemble the parts of the seat for the purpose of repairing or renewing any of the parts thereof.

A further object of my invention is to effect improvements in the securing devices and tensioning devices for the ends of the adductor rod so as to adapt the said securing and tensioning devices also for use as hinge elements for mounting the seat to combine with said hinge elements a pintle rod to prevent them from casually turning and relaxing the tension of the adductor rod.

In the accompanying drawings—Figure 1 is a plan of a seat constructed in accordance with my invention, with portions of the same broken away and in section. Fig. 2 is a longitudinal sectional view of the same on the plane indicated by the line 2—2 of Fig. 1. Fig. 3 is partly a plan and partly a section of a modified form of my invention.

The seat 1 which is substantially annular in form comprises a series of segmental sections which are preferably made of wood, but which may be made of any other suitable material. Any desired number of the sections may be used. The seat shown in the present embodiment of my invention comprises an outer section 2, an inner end section 3, and a pair of side sections or segments 4, the said segments or sections being connected together by radial tongue and groove joints 5. The outer end section 2 is provided with a bore 6 which conforms substantially to the contour thereof, so that it is spaced between the inner and outer edges of the said outer sections, and the said bore is also disposed between and spaced from the upper and lower sides of the said section so that it is entirely concealed. The said bore 6, extends from one end or jointed portion of the said section 2, to the other end or jointed portion thereof, and is composed of a pair of angularly disposed bored arms 7 which meet at the center and open at the ends thereof, and a pair of comparatively short bored arms 8 which extend from the ends of the said section and intersect and are angularly related to the said arms 7. This construction of the bore of the section 2 enables the same to be made with a boring tool or device such for instance as an ordinary brace and bit.

Each segment or section 4 of the seat is provided with a bore 9 composed of a pair of angularly related communicating arms 10 which are bored from opposite ends of the said segment, and are so disposed that they exactly register and communicate with the arms 8 of the bore 6 of the outer end segment 2, when the segments are joined together. The inner end section 3 of the seat is provided near its ends with bores 11, which communicate with the bores 9 of the side or intermediate segments 4, and extend to the rear outer side of said inner end section at points a suitable distance from the ends thereof, and are provided with counterbores 12. Hence the seat is provided with a bore which extends almost continuously around the same and which is entirely concealed excepting at its ends, being spaced from the inner, outer and upper and lower surfaces of the segments of the seat.

An adductor rod 13 which is preferably made of steel or some other metal possessing great tensile strength is extended through the bores 11 of the inner end section 3, the bores 9 of the intermediate or side sections 4, and the arms 8, and inner portions of the arms 7 of the bore 6 of the outer end segment 2. The said adductor rod is provided with screw threads 14 at its ends, and nuts 15 are screwed on the threaded ends of the adductor rod and located in the counterbores 12 of the bores 13. In the modified form of the device shown in Fig. 4, the nuts 15 are shown as provided at their outer ends with slits or kerfs 16, for engagement by a screw driver so that the same may be tightened on the adductor rod as may be required to tension the latter and cause the same by its tension to firmly and securely bind the segments of the seat together.

In the preferred form of the invention shown in the other figures of the drawing, the securing and tension nuts 15 are formed with rearwardly extending arms 17 which project to a required extent beyond the rear or inner end of the seat and are provided with openings for the reception of a pintle rod 18 which also engages openings in hinge lugs 19 formed at the upper ends of screws or bolts 20 which may be engaged with a support for the hinged end of the seat.

It will be understood that by the provision of the arms 17 of the nuts 15, the said nuts in addition to their function in securing and tensioning the adductor rod, are also availed of and utilized as hinge members for mounting the seat. It will be understood also, that the pintle rod which connects the hinge members formed by the said nuts, to the hinge members 19, also serves to prevent the nuts from turning casually on the ends of the adductor rod and loosening the tension thereof.

The seat may be readily disassembled by first removing the nuts from the ends of the adductor rod and then separating the said segments. Hence in the event that any segment of the seat becomes broken or warped, or otherwise injured, it may be readily removed and replaced by another at minimum expense, so that repairs may be readily and economically effected. It will also be understood that by my construction and location of the members of the bore, in the various segments of the seat, and through which bores the adductor rod extends, I am enabled to entirely dispense with the use of a fillet or any filling material whatever, nothing being placed in the communicating bores of the segments of the seat, but the adductor rod which runs through and around the seat.

I claim:—

1. A seat of the class described made up of a series of segmental sections and having a bore extending continuously around the same from one side and back to the same side, the said bore being concealed and being spaced from the surfaces of the seat, and a continuous adductor rod extending throughout the bore and around the seat, and securing and tensioning devices on the ends of the adductor rod and bearing against one side of the seat.

2. A seat of the class described consisting of an annulus formed by a plurality of end and intermediate sections, one end section and each intermediate section having a bore extending therethrough from end to end, spaced from the sides thereof and comprising annularly related communicating intersecting arms, the other end section being provided with cross bores extending from its ends to its outer side and communicating with the bores of the intermediate sections, an adductor rod of less diameter than the bores of the intermediate and first named end sections and extending through the bores of all of and connecting said sections, and tensioning and securing devices on the ends of the adductor rod and bearing against the other end section.

3. A seat of the class described comprising a series of segmental sections provided with communicating bores, an adductor rod extending through the bores of the said sections, and securing and combining said sections together, and securing and adjusting nuts on the ends of the said adductor rods, said securing and adjusting nuts being provided with hinge portions, in combination with hinge members for attachment to a support and a pintle engaging said hinge portions of said securing nuts, and said hinge members, and preventing said securing nuts from casually turning on said adductor rod.

In testimony whereof I hereunto affix my signature in the presence of two witnesses.

AUGUST GERTENBACH.

Witnesses:
Albert C. Koch,
C. L. Chandler.